(12) United States Patent
Kitano (10) Patent No.: US 12,198,014 B2
(45) Date of Patent: Jan. 14, 2025

(54) PROVIDING DEVICE, PROCESSING DEVICE, METHOD FOR PROCESSING INFORMATION, AND PROGRAM

(71) Applicant: Sony Corporation, Tokyo (JP)

(72) Inventor: Hiroaki Kitano, Saitama (JP)

(73) Assignee: Sony Corporation, Tokyo (JP)

( * ) Notice: Subject to any disclaimer, the term of this patent is extended or adjusted under 35 U.S.C. 154(b) by 240 days.

(21) Appl. No.: 16/627,832

(22) PCT Filed: Apr. 6, 2018

(86) PCT No.: PCT/JP2018/014685
§ 371 (c)(1),
(2) Date: Dec. 31, 2019

(87) PCT Pub. No.: WO2019/008853
PCT Pub. Date: Jan. 10, 2019

(65) Prior Publication Data
US 2021/0150405 A1    May 20, 2021

(30) Foreign Application Priority Data
Jul. 7, 2017    (JP) .................................. 2017-133570

(51) Int. Cl.
*G06N 20/00*    (2019.01)
*G06N 3/08*    (2023.01)
(Continued)

(52) U.S. Cl.
CPC .......... *G06N 20/00* (2019.01); *H04L 67/1063* (2013.01); *H04L 67/1097* (2013.01); *G06N 3/08* (2013.01)

(58) Field of Classification Search
CPC .......... G06N 20/00; G06N 3/08; G06N 3/006; G06N 3/04; G06N 99/00; G06N 3/02;
(Continued)

(56) References Cited

U.S. PATENT DOCUMENTS 10,361,869 B2 * 7/2019 Gorman .................. H04L 9/321
2012/0284213 A1 * 11/2012 Lin ........................... G06N 3/08
706/12

(Continued)

FOREIGN PATENT DOCUMENTS

| CN | 103106074 A | 5/2013 |
|----|-------------|--------|
| JP | 2014-228972 A | 12/2014 |

(Continued)

OTHER PUBLICATIONS

International Written Opinion mailed Jul. 10, 2018 in connection with International Application No. PCT/JP2018/014685, and English translation thereof.

(Continued)

*Primary Examiner* — Caroline H Jahnige
(74) *Attorney, Agent, or Firm* — Wolf, Greenfield & Sacks, P.C.

(57) ABSTRACT

There is provided a providing device including a processing unit that enables acquisition of one or both of control information for causing artificial intelligence to function in a device and information for specifying the control information from a distributed network.

12 Claims, 5 Drawing Sheets

(51) Int. Cl.
*H04L 67/1061* (2022.01)
*H04L 67/1097* (2022.01)

(58) Field of Classification Search
CPC . H04L 67/1063; H04L 67/1097; H04L 67/34; H04L 67/06; H04L 67/56; H04L 67/561; G06F 21/6218; G06F 16/906
See application file for complete search history.

(56) References Cited

U.S. PATENT DOCUMENTS

| | | | | |
|---|---|---|---|---|
| 2014/0089232 | A1* | 3/2014 | Buibas | G06N 3/08 706/11 |
| 2016/0217387 | A1* | 7/2016 | Okanohara | G06N 20/00 |
| 2017/0063886 | A1 | 3/2017 | Muddu et al. | |
| 2017/0279774 | A1* | 9/2017 | Booz | G06Q 20/123 |
| 2018/0189732 | A1* | 7/2018 | Kozloski | G06F 8/71 |
| 2018/0285839 | A1* | 10/2018 | Yang | H04L 9/3239 |
| 2018/0293366 | A1* | 10/2018 | Subramaniyan | G06F 21/10 |
| 2020/0019882 | A1* | 1/2020 | Garg | G06F 3/0484 |

FOREIGN PATENT DOCUMENTS

| | | |
|---|---|---|
| JP | 2018173711 A | 11/2018 |
| WO | WO 2012/151198 A1 | 11/2012 |
| WO | WO 2016/118813 A1 | 7/2016 |

OTHER PUBLICATIONS

International Preliminary Report on Patentability mailed Jan. 16, 2020 in connection with International Application No. PCT/JP2018/014685, and English translation thereof.
Extended European Search Report dated Jul. 13, 2020 in connection with European Application No. 18828937.5.
Samaniego et al., Blockchain as a Service for IoT. Cloud versus Fog. 2016 IEEE International Conference on Internet of Things (iThings) and IEEE Green Computing and Communications (GreenCom) and IEEE Cyber, Physical and Social Computing (CPSCom) and IEEE Smart Data (SmartData). IEEE, Dec. 15, 2016. Computer Society. pp. 433-436.
Veena Pureswaran, Empowering the edge Practical insights on a decentralized Internet of Things. IBM Institute for Business Value. Apr. 1, 2015. 24 pages. Retrieved from the Internet: URL: https://www-935.ibm.com/services/multimedia/GBE03662USEN.pdf [retrieved on Mar. 17, 2017].
Watanabe et al., Technology and challenges of Blockchain Platforms, The Institute of Electronics, Information and Communications Engineers, IEICE Technical Research Report, Jun. 29, 2017; 117(114):21-26.
Koimoto J., From IoT to IoA, Extend humanity network, Nikkei Electronics, Feb. 2016, p. 89-101.
International Search Report and English translation thereof mailed Jul. 10, 2018 in connection with International Application No. PCT/JP2018/014685.
Watanabe et al., Technology and challenges of Blockchain Platforms, The Institute of Electronics, Information and Communications Engineers, IEICE Technical Research Report, 2017; 117(114):21-26.
Koimoto J., From IoT to IoA, Extend humanity network, Nikkei Electronics, 2016, p. 89-101.
Samaniego Mayra et al, "Internet of Smart Things—IoST: Using Blockchain and Clips to Make Things Autonomous", 2017 IEEE International Conference on Cognitive Computing (ICCC), Jun. 25, 2017, pp. 9-16.
Communication pursuant to Article 94(3) EPC dated Jan. 25, 2024 in connection with European Application No. 18828937.5.

* cited by examiner

PROVIDING DEVICE, PROCESSING DEVICE, METHOD FOR PROCESSING INFORMATION, AND PROGRAM

CROSS-REFERENCE TO RELATED APPLICATIONS

This application claims the benefit under 35 U.S.C. § 371 as a U.S. National Stage Entry of International Application No. PCT/JP2018/014685, filed in the Japanese Patent Office as a Receiving Office on Apr. 6, 2018, which claims priority to Japanese Patent Application Number JP2017-133570, filed in the Japanese Patent Office on Jul. 7, 2017, each of which is hereby incorporated by reference in its entirety.

TECHNICAL FIELD

The present disclosure relates to a providing device, a processing device, a method for processing information, and a program.

BACKGROUND ART

There has been proposed a concept of the internet of ability (IoA) in which people and robots bring their "ability" through a network and exchange the ability to open up areas of unprecedented use. Examples of a document disclosing the IoA include the non-patent document 1 set out below.

CITATION LIST

Non-Patent Document

Non-Patent Document 1: Junichi REKIMOTO, "Network for expanding humanity, from IoT to IoA", Nikkei Electronics, February 2016, pp. 89-101.

SUMMARY OF THE INVENTION

Problems to be Solved by the Invention

Non-Patent Document 1 discloses that, by exchanging abilities through a network, for example, it becomes possible to expand experiences, communicate collaborative work/ability, and expand existence. However, Non-Patent Document 1 fails to disclose how to exchange abilities through a network.

The present disclosure proposes a novel and improved providing device, processing device, method for processing information, and program capable of implementing ability sharing through a network.

Solutions to Problems

According to the present disclosure, there is provided a providing device including a processing unit that enables acquisition of one or both of control information for causing artificial intelligence to function in a device and information for specifying the control information from a distributed network.

Furthermore, according to the present disclosure, there is provided a processing device including: an acquisition unit that obtains, from a distributed network, one or both of control information for causing artificial intelligence to function in a device and information for specifying the control information to obtain the control information; and a processing unit that executes a predetermined process using the artificial intelligence that functions on the basis of the control information.

Furthermore, according to the present disclosure, there is provided a method for processing information to be executed by a providing device, the method including a step of enabling acquisition of one or both of control information for causing artificial intelligence to function in a device and information for specifying the control information from a distributed network.

Furthermore, according to the present disclosure, there is provided a program for causing a computer to implement a function of enabling acquisition of one or both of control information for causing artificial intelligence to function in a device and information for specifying the control information from a distributed network.

Effects of the Invention

According to the present disclosure, it becomes possible to implement ability sharing through a network.

Note that the effects described above are not necessarily limited, and any of the effects described in the present specification or another effect that can be understood from the present specification may be exerted in addition to the effects described above or instead of the effects described above.

MODE FOR CARRYING OUT THE INVENTION

Hereinafter, a preferred embodiment of the present disclosure will be described in detail with reference to the accompanying drawings. Note that, in the present specification and the drawings, constituent elements having substantially the same functional configuration will be denoted by the same reference signs, and duplicate descriptions thereof will be omitted.

Furthermore, descriptions will be given in the following order.

1. Shared System According to Present Embodiment, and Method for Processing Information According to Present Embodiment
2. Program According to Present Embodiment (Shared System According to Present Embodiment, and Method for Processing Information According to Present Embodiment)

[1] Overview of Shared System

A shared system according to the present embodiment is a system capable of sharing ability of artificial intelligence through a network.

The artificial intelligence according to the present embodiment indicates, for example, a computer program for causing a machine to perform what humans do with intelligence (computational part of ability to achieve actual goals). Since the artificial intelligence is a computer program as mentioned above, at least a part of some abilities involving physical work or intellectual work can be shared by a plurality of devices by data being exchanged through a network.

In the shared system according to the present embodiment, one device included in the shared system is enabled to obtain, through a network, at least one or both of control information for causing the artificial intelligence to function and information for specifying the control information, thereby enabling sharing of the ability of the artificial intelligence through the network.

Examples of the information for specifying the control information according to the present embodiment include a part of or all of information indicating a network structure, a hyperparameter, and a training data set. The information indicating a network structure, the hyperparameter, and the training data set correspond to data for learning the control information for causing the artificial intelligence to function. Two or more of the information indicating a network structure, the hyperparameter, and the training data set may be packaged.

The information indicating a network structure according to the present embodiment is, for example, information indicating a structure of any network such as a neural network. Examples of the information indicating a network structure include data in an optional format that can express a relationship between data in a graph structure.

The hyperparameter according to the present embodiment is a parameter for learning. Taking a case where the information indicating a network structure is information indicating a structure of a neural network as an example, examples of the hyperparameter include the number of neurons, the number of network layers, and a learning rate. Note that the hyperparameter according to the present embodiment is not limited to the example mentioned above, and may be, for example, an optional parameter that can give a range to the network indicated by the information indicating a network structure by performing learning.

The training data set according to the present embodiment is a data group including training data to be used for a plurality of kinds of learning. Examples of the training data include data in an optional format corresponding to learning content, such as image data and text data.

The control information according to the present embodiment corresponds to, for example, learned data for causing the artificial intelligence to function. The learned data is obtained by, for example, learning being performed in an optional learning method, such as deep learning, and deep reinforcement learning combining deep learning and reinforcement learning. Examples of the learned data include optional data (or data group) that can serve as an artificial intelligence module, such as a learned neural network module.

The information for specifying the control information according to the present embodiment is data in an optional format that can specify the control information and obtain the specified information from an external device. Furthermore, the information for specifying the control information according to the present embodiment may be data in an optional format necessary for generating learned data on the basis of the obtained information. Examples of the information for specifying the control information include information for specifying the control information as described below, and data directly indicating an acquisition source of the information for specifying the control information.

Information indicating a network structure, or a uniform resource locator (URL) indicating a download destination of the information indicating a network structure A hyperparameter, or a URL indicating a download destination of the hyperparameter A training data set, or a URL indicating a download destination of the training data set Information for obtaining learned data (e.g., URL indicating a download destination, password required for the download, etc.)

Two or more of the various kinds of information above

For example, in a case where the information for specifying the control information is data representing a URL indicating a download destination of the control information as described in the example above, a device that has obtained the information for specifying the control information accesses the URL to obtain the control information. Furthermore, in a case where the information for specifying the control information is data necessary for generating learned data as described in the example above, for example, a device that has obtained the information for specifying the control information generates, using the device or another device, learned data for causing the artificial intelligence to function on the basis of the information, thereby obtaining the control information.

Note that the information for specifying the control information is not limited to data directly indicating an acquisition source of the control information, such as a URL. For example, the information for specifying the control information may be data that can indirectly specify the acquisition source of the control information.

Examples of the data indirectly specifying the acquisition source of the control information include text data indicating a "keyword for specifying the control information". Examples of the "keyword for specifying the control information" include a character string including a "name of a provider that provides the control information, such as a corporate name, a natural person name, and a name of an organization other than a corporation" and a "file name of the control information".

Furthermore, in a case where there is a training data set whose contents are guaranteed in some form for example, the data indirectly indicating the acquisition source of the control information may be data that can specify a database (e.g., data indicating a name of the database), or may be data that can specify a data repository (e.g., data indicating a name of the data repository). Moreover, in order to ensure validity of the training data set, information such as a hash value and a checksum of the training data set may be added to the information for specifying the control information.

For example, taking a case where the information for specifying the control information is the text data indicating the "keyword for specifying the control information" as an example, a device that has obtained the information for specifying the control information conducts a web search for the keyword indicated by the text data, thereby specifying the URL indicating the download destination of the control information. Then, the device that has obtained the information for specifying the control information accesses the specified URL to obtain the control information.

In the shared system according to the present embodiment, for example, as described above, a device included in the shared system obtains one or both of the control information and the information for specifying the configuration through the network, thereby obtaining the control information through the network. That is, one or both of the control information and the information for specifying the control information that can be obtained through the network in the shared system can be regarded as information for the device to obtain the control information.

Furthermore, the device that has obtained the control information causes the artificial intelligence to function on the basis of the control information. With the artificial intelligence functioning on the basis of the control information, a predetermined process is executed in the device by the artificial intelligence functioning on the basis of the control information.

Accordingly, in the shared system according to the present embodiment, ability of the artificial intelligence is shared on the basis of information (e.g., one or both of the control information and the information for specifying the control information) distributed through the network. Therefore, it becomes possible to share abilities through the network using the shared system according to the present embodiment.

Furthermore, since the artificial intelligence is a computer program for causing a machine to perform what humans do with intelligence, at least a part of some abilities involving physical work or intellectual work can be commoditized. For example, in the shared system according to the present embodiment, at least a part of some abilities involving physical work or intellectual work can be commoditized on the basis of information distributed through the network (e.g., one or both of the control information and the information for specifying the control information). That is, it becomes possible to provide commoditized ability using the shared system according to the present embodiment.

Hereinafter, a process performed in a device included in the shared system (process associated with a method for processing information according to the present embodiment) will be described as well as an exemplary configuration of the shared system according to the present embodiment.

[2] Configuration of Shared System

Figure 1:
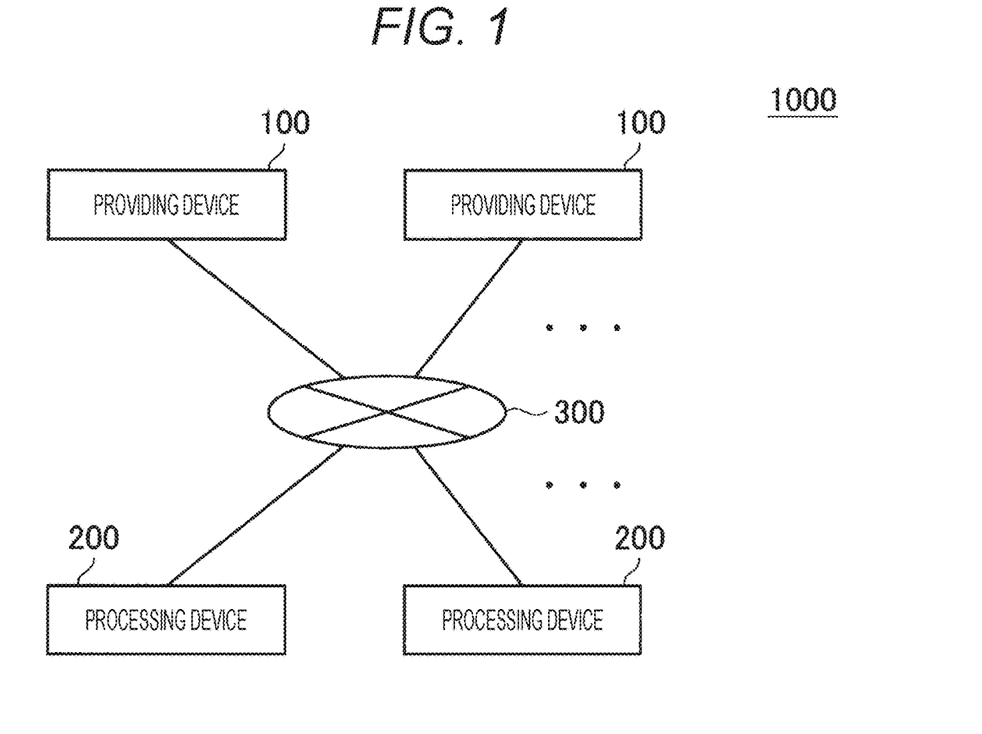
FIG. 1 is an explanatory diagram illustrating an exemplary configuration of a shared system according to the present embodiment.

FIG. 1 is an explanatory diagram illustrating an exemplary configuration of a shared system 1000 according to the present embodiment. The shared system 1000 includes, for example, a providing device 100 and a processing device 200.

The providing device 100 and the processing device 200 are connected wirelessly or by wire, for example, and are included in a network 300. Examples of the network 300 include a distributed network, such as a peer-to-peer (P2P) network. Hereinafter, an exemplary case where the network 300 is a P2P network in which various devices included in the shared system 1000 are connected in an autonomous distributed manner will be mainly described. The providing device 100 and the processing device 200, which are illustrated to be connected through the network 300 in FIG. 1, correspond to devices included in the P2P network. Note that, it is needless to say that the network 300 is not limited to the P2P network.

Note that the shared system according to the present embodiment is not limited to the example illustrated in FIG. 1.

For example, the number of the providing devices 100 included in the network 300 in FIG. 1, and the number of the processing devices 200 included in the network 300 in FIG. 1 are examples, and the number of various devices included in the network 300 is not limited to the example illustrated in FIG. 1.

Furthermore, although the providing device 100 and the processing device 200 are illustrated as separate devices in FIG. 1, for example, a part of or all of the providing devices 100 included in the network 300 and a part of or all of the processing devices 200 included in the network 300 may function as the providing device 100 and the processing device 200.

Hereinafter, devices included in the shared system according to the present embodiment will be described with the shared system 1000 illustrated in FIG. 1 being taken as an example.

[2-1] Providing Device 100

The providing device 100 makes it possible to obtain, for example, one or both of the control information and the information for specifying the control information from the network 300.

More specifically, the providing device 100 registers one or both of the control information and the information for specifying the control information in a P2P database, for example, thereby making it possible to obtain one or both of the control information and the information for specifying the control information from the network 300. Not only the control information but also the information for specifying the control information is registered in the P2P database, whereby, for example, an effect such as "a history of the control information becomes clear" can be exerted.

The P2P database is an exemplary distributed file system utilizing the P2P network. Examples of the P2P database include blockchain data distributed in the P2P network. Examples of the blockchain data according to the present embodiment include blockchain data used for exchanging virtual currency data, such as Bitcoin and Ethereum. Note that, it is needless to say that the blockchain data according to the present embodiment is not limited to the blockchain data used to exchange virtual currency data. Furthermore, the P2P database according to the present embodiment is not limited to blockchain data, and may be any distributed file system capable of implementing a distributed file system utilizing the P2P network.

[2-1-1] Exemplary P2P Database

Before describing a configuration of the providing device 100 and a process in the providing device 100, the P2P database will be described using blockchain data as an example.

Figure 2:
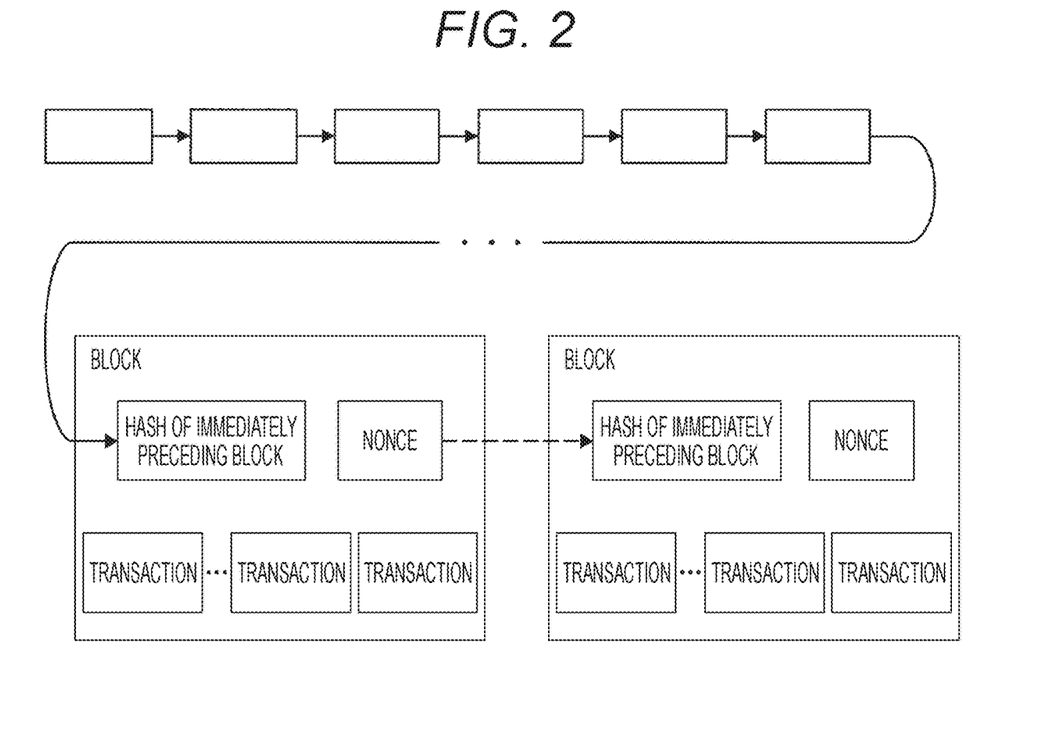
FIG. 2 is an explanatory diagram illustrating an exemplary P2P database.

FIG. 2 is an explanatory diagram illustrating an exemplary P2P database, which illustrates exemplary blockchain data.

As illustrated in FIG. 2, blockchain data is data including a plurality of blocks connected in chains. Each of the blocks includes data of one or more transactions. Furthermore, examples of transaction data include various kinds of data, such as data indicating contents of a transaction such as a value of a traded virtual currency, data indicating an address corresponding to a public key of a P2P network participant (device included in the P2P network; the same applies hereinafter) that generates a transaction, the control information, and the information for specifying the control information.

The blockchain data includes, for example, a hash of the immediately preceding block, and a value called nonce. The hash of the immediately preceding block is used to determine whether or not it is a "correct block" correctly linked from the immediately preceding block, for example. The nonce is used to prevent impersonation in authentication using a hash, for example, and tampering is prevented by the nonce being used. Examples of the nonce include a character string, a number string, and data indicating a combination thereof.

Furthermore, in blockchain data, an electronic signature using an encryption key may be given to transaction data, and transaction data may be encrypted using an encryption key.

Each transaction data is public, and is shared across the P2P network. Note that the same record may not necessarily be retained across the P2P network depending on a type of the P2P database.

Addition of a new block (generation of a new block) to the blockchain data in the P2P network is performed using, for example, a method called the proof of work (PoW), or a method called the proof of stake (PoS). The PoW is a method in which, among participants in a P2P network, a person who has solved a mathematical problem first (e.g., person who has found a hash satisfying a specific condition first) generates a new block. Furthermore, the PoS is a method in which a person who has first solved a mathematical problem whose difficulty level changes depending on assets owned by a participant determined by, for example, an amount of virtual currency, a period of owning the virtual currency, and the like (e.g., person who has first found a hash satisfying a specific condition corresponding to the difficulty level) generates a new block. Note that the method of adding a new block to the blockchain data in the P2P network according to the present embodiment is not particularly limited.

Figure 3:
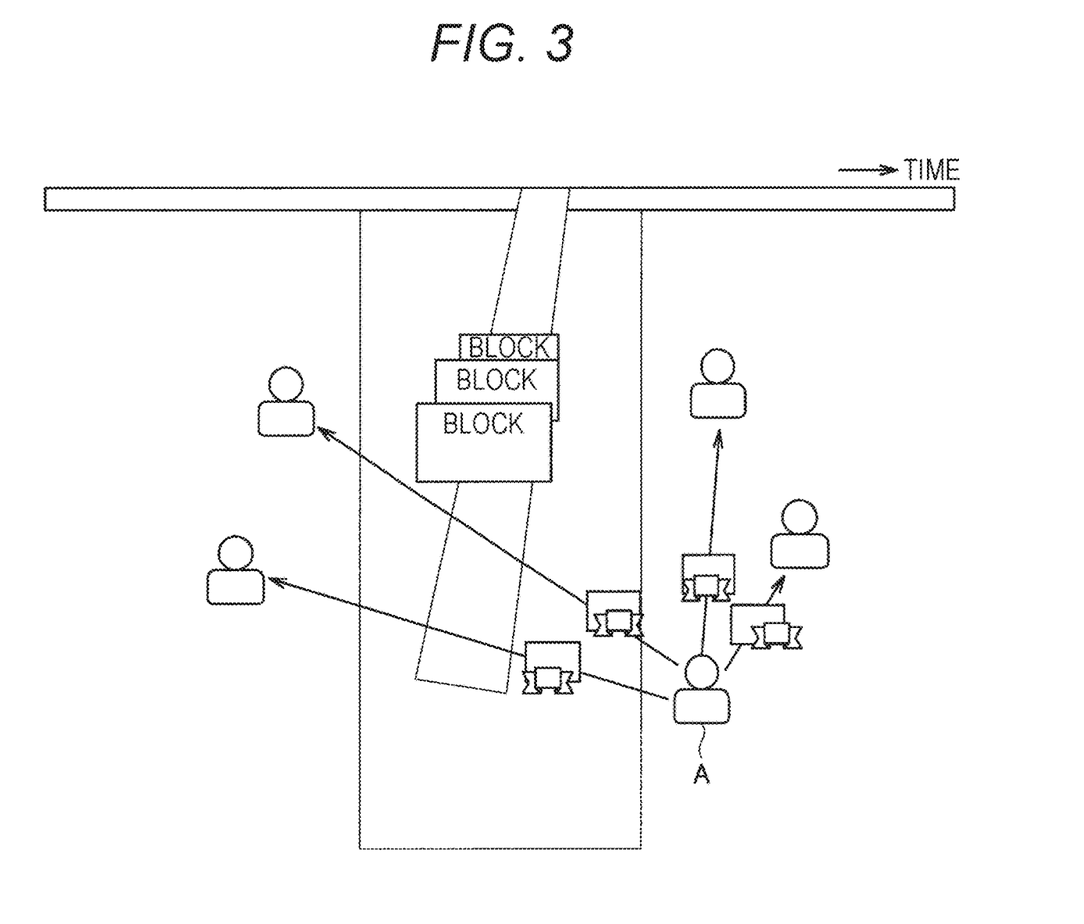
FIG. 3 is an explanatory diagram illustrating exemplary data registration to the P2P database in a P2P network.

FIG. 3 is an explanatory diagram illustrating exemplary data registration to the P2P database in the P2P network, which illustrates exemplary data registration to the blockchain data (exemplary P2P database).

For example, a participant A of the P2P network electronically signs data to be registered in the blockchain data using a secret key of the participant A. With the data to be registered in the blockchain data being electronically signed by the participant A using the secret key, for example, it is ensured that the data belongs to the participant A, the owner of the data is the participant A, or the like. Furthermore, the participant A of the P2P network may encrypt the data to be registered in the blockchain data using a public key of the participant A or the like. Note that, it is needless to say that the data may not be electronically signed using the secret key or may not be encrypted using the public key or the like at the time of being registered in the P2P database.

When the electronic signature is applied, the participant A broadcasts transaction data including the electronically signed data on the P2P network. The transaction data broadcasted on the P2P network is included in a block generated by any P2P network participant, thereby being registered in the blockchain data.

Note that the method of registering data in the P2P database in the P2P network is not limited to the example described above. For example, in the P2P network, side chain technology can be used to register data in the P2P database.

Figure 4:
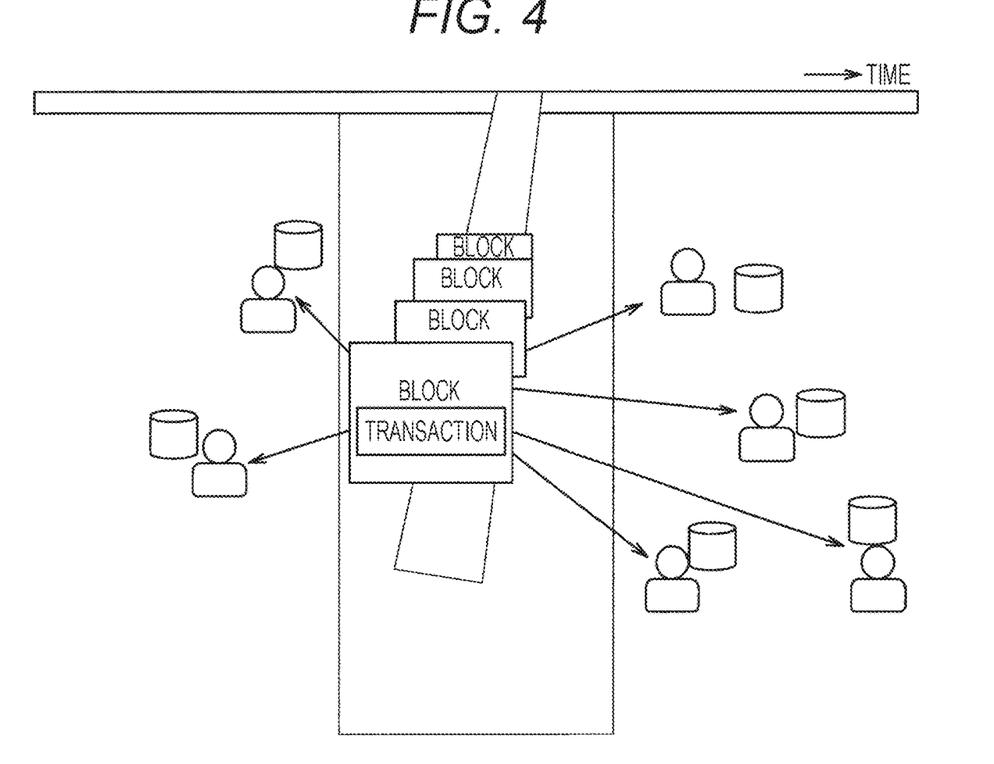
FIG. 4 is an explanatory diagram illustrating exemplary data acquisition from the P2P database in the P2P network.

FIG. 4 is an explanatory diagram illustrating exemplary data acquisition from the P2P database in the P2P network, which illustrates exemplary data acquisition from the blockchain data (exemplary P2P database).

The data to be registered in the blockchain data by a participant of the P2P network is registered in the blockchain data as described with reference to FIG. 3, for example, and as a result, the registered data is shared among all participants of the P2P network, for example. Therefore, each of the participants of the P2P network can obtain data registered in the blockchain data by a participant of the P2P network, the data being stored in the blockchain data, by referring to blockchain data stored in a recording medium corresponding to each of the participants, for example.

Note that, as described above, the same record may not necessarily be retained across the P2P network depending on a type of the P2P database. In the above case, data registered in the blockchain data by a participant of the P2P network is shared by some of the participants of the P2P network, and some of the participants can obtain the registered data by referring to the blockchain data stored in the corresponding recording medium.

Furthermore, in a case where data registered in the blockchain data is electronically signed using a secret key, for example, a participant who has obtained the registered data can verify validity of the registered data having been obtained using a public key corresponding to the secret key. Furthermore, in a case where data registered in the blockchain data is encrypted using a public key, for example, a participant who has obtained the registered data uses a secret key corresponding to the public key to decrypt the registered data having been obtained.

In the shared system 1000, the providing device 100 registers data in the P2P database as described with reference to FIG. 3, for example, whereby one or both of the control information and the information for specifying the control information can be obtained from the network 300.

Furthermore, in the shared system 1000, the processing device 200 obtains data registered in the P2P database as described with reference to FIG. 4, for example, whereby one or both of the control information and the information for specifying the control information can be obtained from the P2P database.

Therefore, in the shared system 1000, ability of the artificial intelligence is shared via the blockchain data (exemplary P2P database).

Furthermore, in the shared system 1000, data is shared on the basis of the blockchain data (exemplary P2P database), whereby the following effects can be exerted, for example.

Data traceability is achieved

Impossibility of data tampering is ensured

Payment using virtual currency supported by blockchain data can be easily made

[2-1-2] Configuration of Providing Device 100 and Exemplary Process in Providing Device 100

Next, a process in the providing device 100 will be described as well as an exemplary configuration of the providing device 100.

Figure 5:
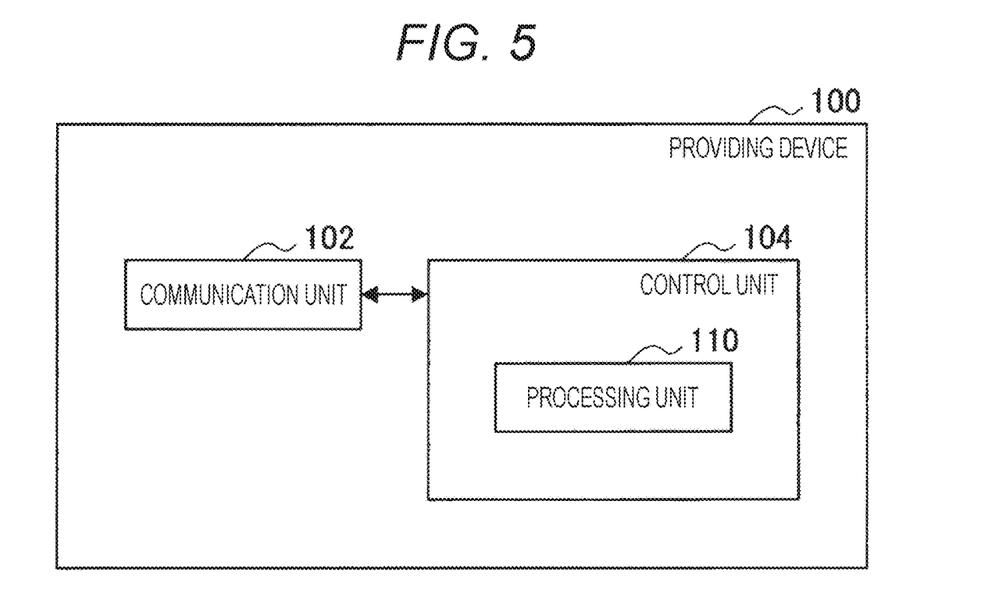
FIG. 5 is a block diagram illustrating an exemplary configuration of a providing device according to the present embodiment.

FIG. 5 is a block diagram illustrating an exemplary configuration of the providing device 100 according to the present embodiment. The providing device 100 includes, for example, a communication unit 102, and a control unit 104.

Furthermore, the providing device 100 may include, for example, a read-only memory (ROM) (not illustrated), a random access memory (RAM) (not illustrated), a storage (not illustrated), an operation unit (not illustrated) capable of being operated by a user of the providing device 100, a display (not illustrated) that displays various screens on a display screen, and the like. The providing device 100 connects the respective components mentioned above using, for example, a bus serving as a data transmission path.

The ROM (not illustrated) stores control data such as operation parameters and programs to be used by the control unit 104. The RAM (not illustrated) temporarily stores, for example, programs to be executed by the control unit 104.

The storage (not illustrated) is a storage means included in the providing device 100, and stores, for example, various kinds of data including data associated with the method for processing information according to the present embodiment, such as the P2P database, various applications, and the like. Here, examples of the storage (not illustrated) include a magnetic recording medium, such as a hard disk, and a non-volatile memory, such as a flash memory. Furthermore, the storage (not illustrated) may be detachable from the providing device 100. Note that the providing device 100 may not include the storage (not illustrated), and various kinds of data of the P2P database or the like may be stored in a recording medium outside the providing device 100.

Examples of the operation unit (not illustrated) include an operation input device to be described later. Furthermore, examples of the display (not illustrated) include a display device to be described later. Note that the providing device 100 may not include one or both of the operation unit (not illustrated) and the display (not illustrated).

[Exemplary Hardware Configuration of Providing Device 100]

Figure 6:
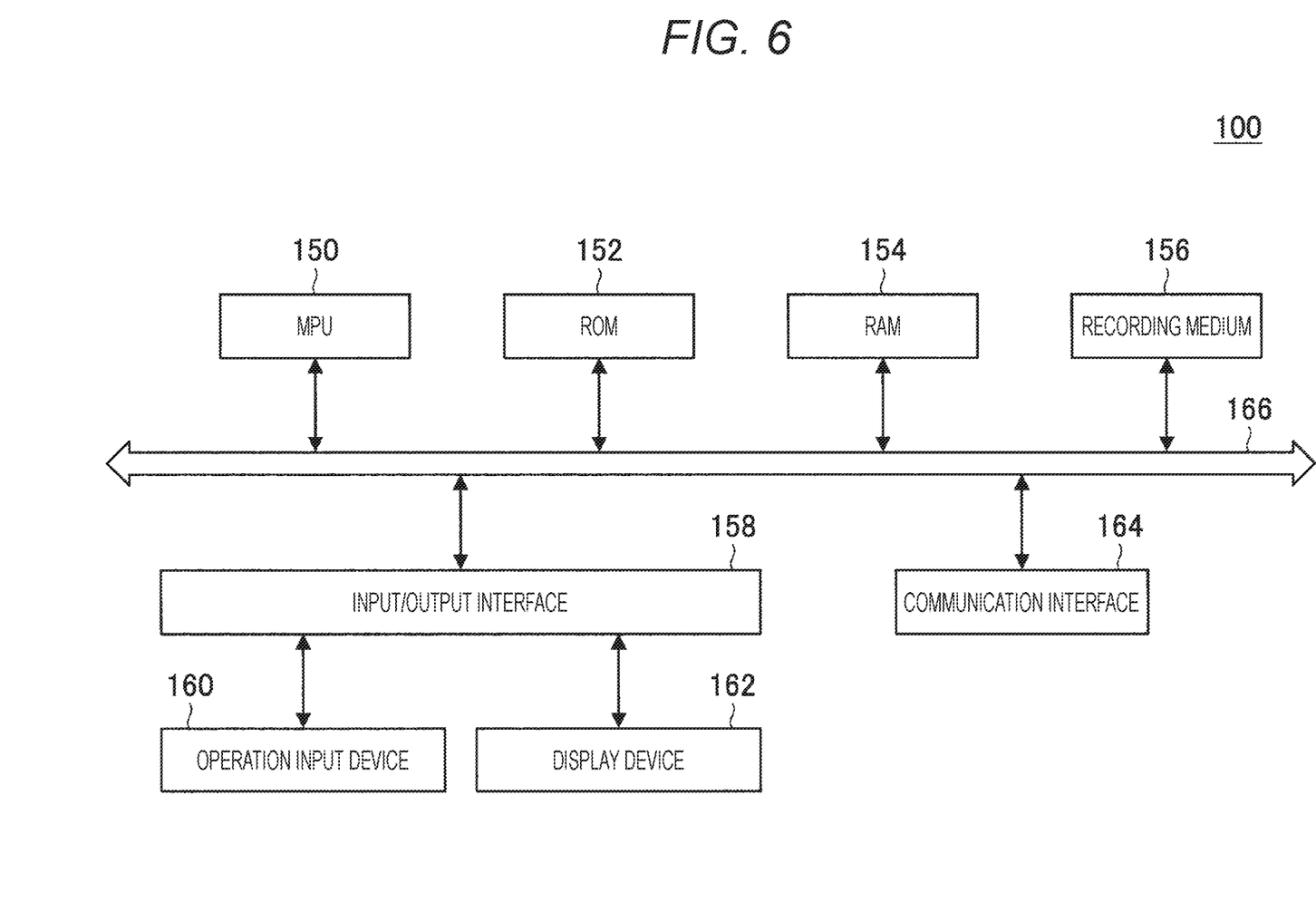
FIG. 6 is an explanatory diagram illustrating an exemplary hardware configuration of the providing device according to the present embodiment.

FIG. 6 is an explanatory diagram illustrating an exemplary hardware configuration of the providing device 100 according to the present embodiment. The providing device 100 includes, for example, an MPU 150, a ROM 152, a RAM 154, a recording medium 156, an input/output interface 158, an operation input device 160, a display device 162, and a communication interface 164. Furthermore, the providing device 100 connects the respective components by, for example, a bus 166 serving as a data transmission path. Furthermore, the providing device 100 is driven by, for example, power supplied from an internal power supply included in the providing device 100, such as a battery, or power supplied from a connected external power supply.

The MPU 150 includes, for example, one or more processors including an arithmetic circuit such as a micro processing unit (MPU), various processing circuits, and the like, and functions as the control unit 104 that controls the entire providing device 100. Furthermore, the MPU 150 functions as, for example, a processing unit 110 to be described later in the providing device 100. Note that the processing unit 110 may include dedicated (or general-purpose) circuitry (e.g., a processor separated from the MPU 150).

The ROM 152 stores programs to be used by the MPU 150, control data such as operation parameters, and the like. The RAM 154 temporarily stores, for example, programs to be executed by the MPU 150.

The recording medium 156 functions as the storage (not illustrated), and stores, for example, various kinds of data including data associated with the method for processing information according to the present embodiment, such as the P2P database, various applications, and the like. Here, examples of the recording medium 156 include a magnetic recording medium, such as a hard disk, and a non-volatile memory, such as a flash memory. Furthermore, the recording medium 156 may be detachable from the providing device 100.

The input/output interface 158 connects, for example, the operation input device 160 and the display device 162. The operation input device 160 functions as the operation unit (not illustrated), and the display device 162 functions as the display (not illustrated). Here, examples of the input/output interface 158 include a universal serial bus (USB) terminal, a digital visual interface (DVI) terminal, a high-definition multimedia interface (HDMI) (registered trademark) terminal, and various processing circuits.

Furthermore, the operation input device 160 is provided on the providing device 100, for example, and is connected to the input/output interface 158 inside the providing device 100. Examples of the operation input device 160 include buttons, direction keys, a rotary selector such as a jog dial, and a combination thereof.

Furthermore, the display device 162 is provided on the providing device 100, for example, and is connected to the input/output interface 158 inside the providing device 100. Examples of the display device 162 include a liquid crystal display, and an organic EL display.

Note that it is needless to say that the input/output interface 158 can be connected to an external device, such as an operation input device outside the providing device 100 (e.g., keyboard, mouse, etc.) and an external display device. Furthermore, the display device 162 may be a device capable of performing display and user operation, such as a touch panel.

The communication interface 164 is a communication means included in the providing device 100, and functions as the communication unit 102 for performing wireless or wired communication with other devices included in the shared system 1000, such as the providing device 100 and the processing device 200. Furthermore, the communication interface 164 is also capable of performing wireless or wired communication with a device other than the devices included in the shared system 1000. Here, examples of the communication interface 164 include a communication antenna and a radio frequency (RF) circuit (wireless communication), an IEEE 802.15.1 port and a transmission/reception circuit (wireless communication), an IEEE 802.11 port and a transmission/reception circuit (wireless communication), and a local area network (LAN) terminal and a transmission/reception circuit (wired communication). Furthermore, the communication interface 164 may have any configuration capable of communicating with devices included in the network 300.

The providing device 100 makes it possible to obtain one or both of the control information and the information for specifying the control information from the network 300 on the basis of, for example, the configuration illustrated in FIG. 6. Note that the hardware configuration of the providing device 100 according to the present embodiment is not limited to the configuration illustrated in FIG. 6.

For example, in a case where the providing device 100 communicates with an external device or the like via an external communication device connected thereto, it may not include the communication interface 164. Furthermore, the communication interface 164 may have a configuration capable of communicating with one or more external devices using a plurality of communication schemes.

Furthermore, the providing device 100 can take a configuration not including some or all of the recording medium 156, the operation input device 160, and the display device 162, for example.

Furthermore, the providing device 100 can take a configuration corresponding to exemplary application of the providing device 100 to be described later, for example.

Furthermore, a part of or all of the configuration (or the configuration according to variations) illustrated in FIG. 6 may be implemented by one or more integrated circuits (ICs), for example.

An exemplary configuration of the providing device 100 will be described with reference to FIG. 5 again. The communication unit 102 is a communication means included in the providing device 100, and performs wireless or wired communication with other devices included in the shared system 1000, such as the providing device 100 and the processing device 200. Furthermore, the communication unit 102 is also capable of performing wireless or wired communication with a device other than the devices included in the shared system 1000. Communication in the communication unit 102 is controlled by, for example, the control unit 104.

Here, while examples of the communication unit 102 include a communication antenna, an RF circuit, a LAN terminal, and a transmission/reception circuit, the configuration of the communication unit 102 is not limited to the above. For example, the communication unit 102 may have a configuration supporting any standard capable of performing communication, such as a USB terminal and a transmission/reception circuit, or any configuration capable of communicating with devices included in the network 300. Furthermore, the communication unit 102 may have a configuration capable of communicating with one or more external devices using a plurality of communication schemes.

The control unit 104 includes, for example, an MPU or the like, and functions to control the entire providing device 100. Furthermore, the control unit 104 includes, for example, the processing unit |10, and functions to lead a process associated with a method for processing information in the providing device 100.

The processing unit |10 makes it possible to obtain one or both of the control information and the information for specifying the control information from the network 300 that is a distributed network. As described with reference to FIG. 3, for example, the processing unit |10 registers one or both of the control information and the information for specifying the control information in the P2P database, thereby making it possible to obtain one or both of the control information and the information for specifying the control information from the network 300.

Note that the information that can be obtained by the processing unit |10 from the network 300 is not limited to the example described above.

For example, the processing unit |10 may further make it possible to obtain, from the network 300, a "program (computer program) for causing a set process to be automatically executed in a case where a set condition is satisfied" in addition to one or both of the control information and the information for specifying the control information. As described with reference to FIG. 3, for example, the processing unit |10 registers the "program for causing a set process to be automatically executed in a case where a set condition is satisfied" in the P2P database, thereby making it possible to obtain the program from the network 300.

With the "program for causing a set process to be automatically executed in a case where a set condition is satisfied" being registered in the P2P database, in the shared system 1000, a predetermined process is automatically executed in a case where a condition is satisfied on the basis of the program.

Therefore, with the processing unit |10 registering the "program for causing a set process to be automatically executed in a case where a set condition is satisfied" in the P2P database, an automatic contract mechanism called a smart contract is implemented in the shared system 1000. Furthermore, the "program for causing a set process to be automatically executed in a case where a set condition is satisfied" corresponds to an agent program for implementing a smart contract.

Furthermore, the processing unit |10 may further make it possible to obtain, from the network 300, metadata of the control information, for example, in addition to one or both of the control information and the information for specifying the control information.

Examples of the metadata of the control information include data with any contents related to the control information, such as data indicating the following contents.

Application of artificial intelligence that functions on the basis of the control information (e.g., for autonomous driving, cooking, assembling articles, translation, etc.)
 Hardware functional requirements for causing artificial intelligence to function on the basis of the control information
 A provider of the control information
 Reliability (e.g., error rate) of the control information in a case where artificial intelligence is caused to function
 Evaluation information (e.g., subjective evaluation by a user, etc.) in a case where artificial intelligence is caused to function on the basis of the control information
 Information associated with licensing of the control information (e.g., licensing terms, consideration, payment method, etc.)
 A combination of two or more of the above Note that, it is needless to say that the contents indicated by the metadata of the control information are not limited to the examples mentioned above. Furthermore, the usage indicated by the metadata of the control information may be classified in a more detailed manner than the examples mentioned above, such as for autonomous driving on a snowy road, for autonomous driving in XX area, and for autonomous driving from a point YY to a point ZZ.

As described with reference to FIG. 3, for example, the processing unit |10 registers the metadata of the control information in the P2P database, thereby making it possible to obtain the metadata of the control information from the network 300. The P2P database in which the metadata is registered may be the same as or different from the P2P database in which one or both of the control information and the information for specifying the control information are registered.

With the metadata of the control information being registered in the P2P database, for example, an effect such as "it becomes easier for the processing device 200 to obtain desired control information" is exerted in the shared system 1000.

The control unit 104 makes it possible to obtain one or both of the control information and the information for specifying the control information from the network 300 by including the processing unit |10, for example. Furthermore, the control unit 104 can further make it possible to obtain, from the network 300, one or both of the "program for causing a set process to be automatically executed in a case where a set condition is satisfied" and the metadata of the control information by including the processing unit 110, for example.

Note that the configuration of the control unit 104 is not limited to the example illustrated in FIG. 5.

For example, the control unit 104 can have a configuration corresponding to how the process (process associated with the method for processing information in the providing device 100) to be performed in the providing device 100 is split.

The providing device 100 makes it possible to obtain at least one or both of the control information and the information for specifying the control information from the network 300 on the basis of, for example, the configuration illustrated in FIG. 5.

As described above, a device included in the shared system 1000 can obtain the control information through the network 300 by obtaining one or both of the control information and the information for specifying the configuration through the network 300. Furthermore, as described above, in the device that has obtained the control information in the shared system 1000, the artificial intelligence functions on the basis of the control information, and a predetermined process is executed on the basis of the artificial intelligence.

Therefore, in the shared system 1000 including the providing device 100, ability of the artificial intelligence is shared on the basis of information (e.g., one or both of the control information and the information for specifying the control information) distributed through the network 300, thereby implementing sharing of the ability through the network 300.

Furthermore, with the configuration illustrated in FIG. 5, for example, the providing device 100 can exert the effect to be exerted by the process (process associated with the method for processing information in the providing device 100) performed in the providing device 100 as described above.

Note that the configuration of the providing device according to the present embodiment is not limited to the configuration illustrated in FIG. 5.

For example, the providing device according to the present embodiment can include the processing unit 110 illustrated in FIG. 5 separately from the control unit 104 (e.g., the processing unit 110 can be implemented by another processing circuit).

Furthermore, in the case of communicating with an external device via an external communication device having a function and a configuration similar to those of the communication unit 102, for example, the providing device according to the present embodiment may not include the communication unit 102.

[2-1-3] Exemplary Application of Providing Device Included in Shared System According to Present Embodiment Although the providing device has been described above as a component of the shared system according to the present embodiment, the present embodiment is not limited to such a form. The providing device according to the present embodiment can be applied to any device capable of performing the process (process associated with the method for processing information in the providing device 100) performed in the providing device 100 described above, such as a "computer such as a personal computer (PC) and a server", a "tablet device", and a "game machine". Furthermore, the providing device according to the present embodiment can be applied to a device that functions as a processing device 200 to be described later. Moreover, the providing device according to the present embodiment can be applied to an IC that can be incorporated into a device as described above, for example.

Furthermore, the providing device according to the present embodiment may be applied to a processing system assumed to be subject to network connection (or communication between devices), such as cloud computing. Examples of the processing system mentioned above include a "system in which one device included in the processing system processes a part of the process (process associated with the method for processing information in the providing device 100) performed in the providing device 100, and another device included in the processing system processes the process other than the part of the process performed in the providing device 100".

[2-2] Processing Device 200

The processing device 200 is a device capable of performing processing using artificial intelligence. In the processing device 200, for example, the artificial intelligence functions on the basis of the control information obtained through the network 300. That is, ability of the artificial intelligence in the processing device 200 can vary depending on the obtained control information.

[2-2-1] Configuration of Providing Device 200 and Exemplary Process in Processing Device 200

Hereinafter, a process in the processing device 200 will be described as well as an exemplary configuration of the processing device 200.

Figure 7:
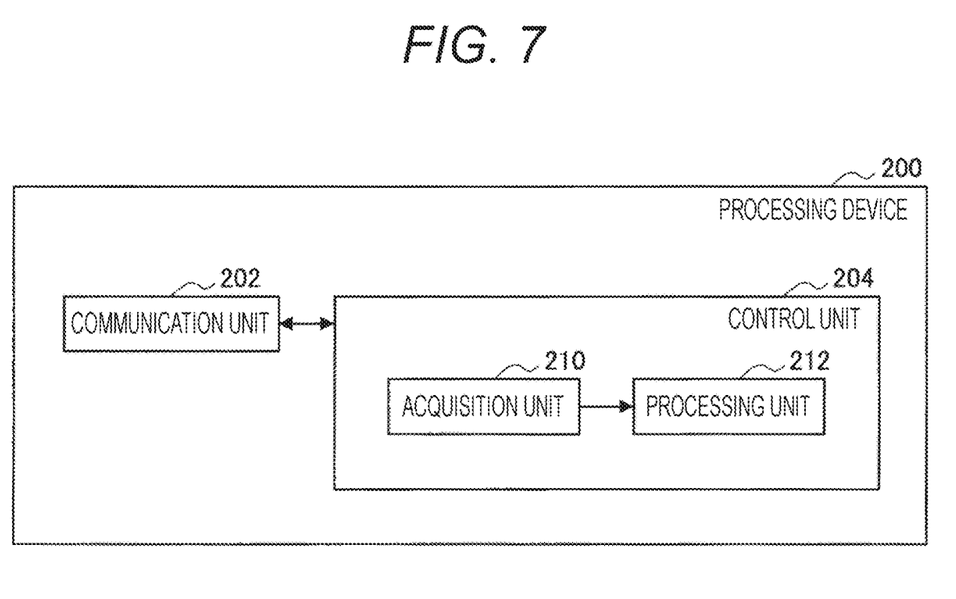
FIG. 7 is a block diagram illustrating an exemplary configuration of a processing device according to the present embodiment.

FIG. 7 is a block diagram illustrating an exemplary configuration of the processing device 200 according to the present embodiment. The processing device 200 includes, for example, a communication unit 202, and a control unit 204.

Furthermore, the processing device 200 may include, for example, a ROM (not illustrated), a RAM (not illustrated), a storage (not illustrated), an operation unit (not illustrated) capable of being operated by a user of the processing device 200, a display (not illustrated) that displays various screens on a display screen, and the like. The processing device 200 connects the respective components mentioned above using, for example, a bus serving as a data transmission path. Furthermore, the processing device 200 is driven by, for example, power supplied from an internal power supply included in the processing device 200, such as a battery, or power supplied from a connected external power supply.

The ROM (not illustrated) stores control data such as operation parameters and programs to be used by the control unit 204. The RAM (not illustrated) temporarily stores, for example, programs to be executed by the control unit 204.

The storage (not illustrated) is a storage means included in the processing device 200, and stores, for example, various kinds of data including data associated with the method for processing information according to the present embodiment, such as the P2P database, various applications, and the like. Here, examples of the storage (not illustrated) include a magnetic recording medium, such as a hard disk, and a non-volatile memory, such as a flash memory. Furthermore, the storage (not illustrated) may be detachable from the processing device 200. Note that the processing device 200 may not include the storage (not illustrated), and various kinds of data of the P2P database or the like may be stored in a recording medium outside the processing device 200.

Examples of the operation unit (not illustrated) include the operation input device 160 described with reference to FIG. 6. Furthermore, examples of the display (not illustrated) include the display device 162 described with reference to FIG. 6. Note that the processing device 200 may not include one or both of the operation unit (not illustrated) and the display (not illustrated).

[Exemplary Hardware Configuration of Processing Device 200]

The processing device 200 has a hardware configuration (including variations) similar to that of the providing device 100 illustrated in FIG. 6, for example.

Note that the hardware configuration of the processing device 200 according to the present embodiment is not limited to the hardware configuration similar to that of the providing device 100 illustrated in FIG. 6. For example, the processing device 200 can take a configuration corresponding to exemplary application of the processing device 200 to be described later.

An exemplary configuration of the processing device 200 will be described with reference to FIG. 7 again. The communication unit 202 is a communication means included in the processing device 200, and performs wireless or wired communication with devices included in the shared system 1000, such as the providing device 100 and other processing devices 200. Furthermore, the communication unit 202 is also capable of performing wireless or wired communication with a device other than the devices included in the shared system 1000. Communication in the communication unit 202 is controlled by, for example, the control unit 204.

Here, while examples of the communication unit 202 include a communication antenna, an RF circuit, a LAN terminal, and a transmission/reception circuit, the configuration of the communication unit 202 is not limited to the above. For example, the communication unit 202 may have a configuration supporting any standard capable of performing communication, such as a USB terminal and a transmission/reception circuit, or any configuration capable of communicating with devices included in the network 300. Furthermore, the communication unit 202 may have a configuration capable of communicating with one or more external devices using a plurality of communication schemes.

The control unit 204 includes, for example, an MPU or the like, and functions to control the entire processing device 200. Furthermore, the control unit 204 includes, for example, an acquisition unit 210 and a processing unit 212, and functions to lead a process associated with a method for processing information in the processing device 200.

The acquisition unit 210 obtains one or both of the control information and the information for specifying the control information from the network 300 that is a distributed network, thereby obtaining the control information.

As described with reference to FIG. 4, for example, the acquisition unit 210 obtains one or both of the control information and the information for specifying the control information from the P2P database.

For example, in a case where the information for specifying the control information is obtained from the P2P database, the acquisition unit 210 obtains, from an external device, the control information specified by the information for specifying the control information. As described above, for example, the acquisition unit 210 accesses the URL specified on the basis of the information for specifying the control information to obtain the control information specified by the information for specifying the control information from the external device. For example, the acquisition unit 210 refers to the information for specifying the control information (an exemplary case where the information for specifying the control information is data directly indicating the acquisition source of the control information) or conducts a web search for the keyword indicated by the information for specifying the control information (an exemplary case where the information for specifying the control information is data indirectly indicating the acquisition source of the control information), thereby specifying the URL.

Furthermore, in a case where the control information is obtained from an external device on the basis of the information for specifying the control information, the acquisition unit 210 may verify the validity of the control information obtained from the external device. For example, the acquisition unit 210 performs an optional process capable of verifying the validity of the control information obtained from the external device, such as comparison of checksums and hash values, thereby verifying the validity of the control information obtained from the external device. In a case where the validity of the control information obtained from the external device is verified, information necessary for verifying the validity of the control information is registered in the P2P database, for example, as described above.

Here, for example, the acquisition unit 210 may obtain, from the P2P database, one or both of the control information satisfying an acquisition condition and information for specifying the control information satisfying the acquisition condition. Examples of the acquisition condition include, as listed below, a condition corresponding to the metadata of the control information described above. Note that it is needless to say that the example of the acquisition condition is not limited to the examples listed below.

A condition for specifying application of artificial intelligence

A condition for specifying a hardware configuration of the processing device 200 (exemplary condition for obtaining control information executable by the processing device 200)

A condition for specifying a provider of the control information

A condition for specifying reliability allowed in a case where the artificial intelligence is caused to function on the basis of the control information (exemplary condition for specifying a risk allowed in the processing device 200)

A condition for specifying evaluation information allowed in a case where the artificial intelligence is caused to function on the basis of the control information (another exemplary condition for specifying a risk allowed in the processing device 200)

A condition for specifying information associated with licensing of the control information A combination of two or more of the above The acquisition unit 210 searches the P2P database with a set acquisition condition, thereby obtaining one or both of the information for specifying the control information satisfying the acquisition condition from the P2P database. The acquisition condition is set by, for example, operation performed on a display screen of the display (not illustrated) included in the processing device 200, or operation performed on a user interface (UI) screen displayed on a display screen of a display device outside the processing device 200. A part or all of the setting of the acquisition condition may be automatically performed by the artificial intelligence on the basis of a predetermined trigger, such as an operation to start acquisition of the control information.

The processing unit 212 executes a predetermined process using artificial intelligence. Contents of the process performed by the artificial intelligence and processing ability of the artificial intelligence can change on the basis of the control information obtained by the acquisition unit 210. Accordingly, in a case where the acquisition unit 210 obtains the control information satisfying the acquisition condition, a process corresponding to the set acquisition condition is performed in the processing device 200, whereby the processing device 200 can demonstrate ability corresponding to the set acquisition condition.

Note that the process performed in the processing unit 212 is not limited to the example described above.

For example, the processing unit 212 may register, in the P2P database, information indicating a state after the artificial intelligence executes the predetermined process. As described with reference to FIG. 3, for example, the processing unit 212 registers, in the P2P database, the information indicating a state after execution of the predetermined process.

For example, the processing unit 212 executes the "program for causing a set process to be automatically executed in a case where a set condition is satisfied" registered in the P2P database, thereby registering the information indicating a state after execution of the predetermined process in the P2P database. Registration of the information indicating a state after execution of the predetermined process in the P2P database, which is implemented by execution of the "program for causing a set process to be automatically executed in a case where a set condition is satisfied" registered in the P2P database, corresponds to automatic implementation of a contract based on a smart contract.

Furthermore, in a case where the "program for causing a set process to be automatically executed in a case where a set condition is satisfied" is executed, the processing unit 212 may register the history of the execution of the program in the P2P database. With the history of the execution of the "program for causing a set process to be automatically executed in a case where a set condition is satisfied" being registered in the P2P database, the implementation history of the smart contract is recorded in the P2P database, thereby ensuring the validity of the automatic contract.

Examples of the information indicating a state after the artificial intelligence executes the predetermined process include "data associated with an accident indicating a type of an error caused by the execution of the predetermined process, time of occurrence of the error, and the like", and "data associated with an incident". For example, the data associated with an accident or the data associated with an incident is registered in the P2P database as the information indicating a state after execution of the predetermined process, whereby quality of the information (e.g., one or both of the control information and the information for specifying the control information) distributed through the network 300 is improved in the shared system 1000. Note that the information indicating a state after the artificial intelligence executes the predetermined process may be registered in a P2P database different from that of the control information of the artificial intelligence. In that case, the P2P database in which the control information is registered retains information indicating the P2P database in which the information indicating a state after the artificial intelligence executes the predetermined process is registered.

Note that the contents of the information indicating a state after execution of the predetermined process, a condition for registering the information indicating a state after execution of the predetermined process in the P2P database, and the like can vary depending on the "program for causing a set process to be automatically executed in a case where a set condition is satisfied" registered in the P2P database.

Furthermore, the process executed by the "program for causing a set process to be automatically executed in a case where a set condition is satisfied" registered in the P2P database is not limited to the process of registering the information indicating a state after execution of the predetermined process in the P2P database. For example, the processing device 200 can perform an optional process set in the "program for causing a set process to be automatically executed in a case where a set condition is satisfied" after the condition set in the processing device is satisfied.

The control unit 204 causes the artificial intelligence to function on the basis of the control information obtained through the network 300 to execute a predetermined process by including the acquisition unit 210 and the processing unit 212, for example.

Note that the configuration of the control unit 204 is not limited to the example illustrated in FIG. 7.

For example, the control unit 204 can have a configuration corresponding to how the process (process associated with the method for processing information in the processing device 200) to be performed in the processing device 200 is split.

With the configuration illustrated in FIG. 7, for example, the processing device 200 causes the artificial intelligence to function on the basis of the control information obtained through the network 300 to execute the predetermined process.

Here, the ability of the artificial intelligence in the processing device 200 can vary depending on the control information obtained through the network 300.

Therefore, in the shared system 1000 including the processing device 200, sharing of ability through the network 300 can be implemented.

Furthermore, with the configuration illustrated in FIG. 7, for example, the processing device 200 can exert the effect to be exerted by the process (process associated with the method for processing information in the processing device 200) performed in the processing device 200 as described above.

Note that the configuration of the processing device according to the present embodiment is not limited to the configuration illustrated in FIG. 7.

For example, the processing device according to the present embodiment can include one or both of the acquisition unit 210 and the processing unit 212 illustrated in FIG. 7 separately from the control unit 204 (e.g., one or both of the acquisition unit 210 and the processing unit 212 can be implemented by a separate processing circuit).

Furthermore, in the case of communicating with an external device via an external communication device having a function and a configuration similar to those of the communication unit 202, for example, the processing device according to the present embodiment may not include the communication unit 202.

[2-2-2] Exemplary Application of Processing Device Included in Shared System According to Present Embodiment Although the processing device has been described above as a component of the shared system according to the present embodiment, the present embodiment is not limited to such a form. The processing device according to the present embodiment can be applied to any device capable of performing a process based on artificial intelligence, such as a "computer such as a PC and a server", a "tablet device", a "game machine", "any mobile object such as an automobile", "any robot such as a manipulator and an autonomous mobile robot", and a "drone (machine capable of performing operation based on remote control or autonomous operation)". Furthermore, the processing device according to the present embodiment can be applied to a device that functions as the providing device 100 described above. Moreover, the processing device according to the present embodiment can be applied to an IC that can be incorporated into a device as described above, for example.

(Program According to Present Embodiment)

[I] Program for Functioning as Providing Device According to Present Embodiment

A program for causing a computer system to function as a providing device according to the present embodiment (e.g., program capable of implementing the function of the processing unit l10) is executed by a processor or the like in the computer system, whereby sharing of ability through the network can be implemented. Here, examples of the computer system according to the present embodiment include a single computer and multiple computers. A series of processing is performed by the computer system according to the present embodiment.

Furthermore, the program for causing a computer system to function as a providing device according to the present embodiment is executed by a processor or the like in the computer system, whereby the effect exerted by the process associated with the method for processing information in the providing device according to the present embodiment described above can be exerted.

[II] Program for Functioning as Processing Device According to Present Embodiment The program for causing a computer system to function as a processing device according to the present embodiment (e.g., program capable of implementing the function of the acquisition unit 210 and the function of the processing unit 212) is executed by a processor or the like in the computer system, whereby sharing of ability through the network can be implemented.

Furthermore, the program for causing a computer system to function as a processing device according to the present embodiment is executed by a processor or the like in the computer system, whereby the effect exerted by the process associated with the method for processing information in the processing device according to the present embodiment described above can be exerted.

Although the preferred embodiment of the present disclosure has been described in detail with reference to the accompanying drawings, the technical scope of the present disclosure is not limited to such examples. It is obvious that those skilled in the art in the technical field of the present disclosure may find various alterations and modifications within the technical ideas of the appended claims, and it should be understood that such alterations and modifications are also naturally within the technical scope of the present disclosure.

For example, although the "shared system 1000 in which ability is shared through the network on the basis of information registered in the P2P database" has been described above, the shared system according to the present embodiment is not limited to the example described above. For example, the shared system according to the present embodiment may be a centralized system, such as a server-client system. Examples of a case where the shared system according to the present embodiment is a centralized system include a system in which a device that functions as a server manages various kinds of information including at least one or both of the control information and the information for specifying the control information, and a device that functions as a client obtains the various kinds of information from the device that functions as a server. Even in the case of the centralized system as described above, sharing of ability through the network can be implemented by the device functioning as a client causing the artificial intelligence to function on the basis of the obtained control information and executing a predetermined process.

Furthermore, while the foregoing has described that the program (computer program) for causing the computer system to function as a providing device according to the present embodiment and the program (computer program) for causing the computer system to function as a processing device according to the present embodiment are provided, the present embodiment can also provide a recording medium storing each of the programs described above, or a recording medium storing both of the programs described above.

The configuration described above is an example of the present embodiment, which naturally belongs to the technical scope of the present disclosure.

Furthermore, the effects described in the present specification are merely illustrative or exemplary, and are not limited. That is, the techniques according to the present disclosure can exert other effects obvious to those skilled in the art from the disclosure of the present specification together with or instead of the effects described above.

Note that the following configurations are also within the technical scope of the present disclosure.

(1)

A providing device including a processing unit that enables acquisition of one or both of control information for causing artificial intelligence to function in a device and information for specifying the control information from a distributed network.

(2)

The providing device according to (1), in which the processing unit enables acquisition of one or both of the control information and the information for specifying the control information from the distributed network by registering one or both of the control information and the information for specifying the control information in a P2P database.

(3)

The providing device according to (1) or (2), in which the processing unit further enables acquisition of a program for causing a set process to be automatically executed in a case where a set condition is satisfied from the distributed network.

(4)

The providing device according to (3), in which the processing unit enables acquisition of the program from the distributed network by registering the program in a P2P database.

(5)

The providing device according to any one of (1) to (4), in which the processing unit further enables acquisition of metadata of the control information from the distributed network.

(6)

The providing device according to (5), in which the processing unit enables acquisition of the metadata of the control information from the distributed network by registering the metadata of the control information in a P2P database.

(7)

The providing device according to any one of (2) to (6), in which the information for specifying the control information includes a part or all of information for obtaining, from other than the P2P database, information indicating a network structure, a hyperparameter that is a parameter for learning, a training data set for learning, and learned data.

(8)

A processing device including:

an acquisition unit that obtains, from a distributed network, one or both of control information for causing artificial intelligence to function in a device and information for specifying the control information to obtain the control information; and a processing unit that executes a predetermined process using the artificial intelligence that functions on the basis of the control information.

(9)

The processing device according to (8), in which the acquisition unit obtains one or both of the control information and the information for specifying the control information from a P2P database of a P2P network that is the distributed network.

(10)

The processing device according to (9), in which the acquisition unit obtains, from the P2P database, one or both of the control information satisfying an acquisition condition and the information for specifying the control information satisfying the acquisition condition.

(11)

The processing device according to (9) or (10), in which the processing unit registers information indicating a state after execution of the predetermined process in the P2P database.

(12)

The processing device according to (11), in which the processing unit registers, in the P2P database, the information indicating a state after execution of the predetermined process by executing a program for causing a set process to be automatically executed in a case where a set condition is satisfied, the program being registered in the P2P database.

(13)

The processing device according to any one of (8) to (12), in which in a case where the information for specifying the control information is obtained from the distributed network, the acquisition unit obtains the control information specified by the information for specifying the control information from an external device.

(14)

A method for processing information to be executed by a providing device, the method including a step of enabling acquisition of one or both of control information for causing artificial intelligence to function in a device and information for specifying the control information from a distributed network.

(15)

A program for causing a computer to implement a function of enabling acquisition of one or both of control information for causing artificial intelligence to function in a device and information for specifying the control information from a distributed network.

REFERENCE SIGNS LIST

100 Providing device
102, 202 Communication unit
104, 204 Control unit
110, 212 Processing unit
200 Processing device
210 Acquisition unit
300 Network
1000 Shared system

The invention claimed is:

1. A providing device comprising:
circuitry configured to function as:
a processing unit that:
enables acquisition of one or both of control information for causing artificial intelligence to function in a device comprising learned data comprising a learned neural network module and information for specifying the control information from a distributed network comprising a neural network, a parameter for learning comprising a number of neurons and a number of network layers, and a training data set,
verifying with a private key a validity of the one or both of control information for causing artificial intelligence to function in a device and information for specifying the control information, and
registers, in a peer-to-peer (P2P) database, information indicating a state after execution of a predetermined process by executing a program for causing a set process to be automatically executed in a case where a set condition is satisfied, the program being registered in the P2P database; and
an acquisition unit that:
obtains one or both of the control information and the information for specifying the control information from the P2P database, wherein the control information and the information for specifying the control information are electronically signed using a secret key and encrypted using a public key;
wherein the P2P database is of a P2P network that is the distributed network,
wherein the P2P database comprises a distributed file system utilizing the P2P network.

2. The providing device according to claim 1, wherein the processing unit enables acquisition of one or both of the control information and the information for specifying the control information from the distributed network by registering one or both of the control information and the information for specifying the control information in the P2P database.

3. The providing device according to claim 1, wherein the processing unit further enables acquisition of the program for causing the set process to be automatically executed in the case where the set condition is satisfied from the distributed network.

4. The providing device according to claim 3, wherein the processing unit enables acquisition of the program from the distributed network by registering the program in the P2P database.

5. The providing device according to claim 1, wherein the processing unit further enables acquisition of metadata of the control information from the distributed network.

6. The providing device according to claim 5, wherein the processing unit enables acquisition of the metadata of the control information from the distributed network by registering the metadata of the control information in the P2P database.

7. The providing device according to claim 2, wherein the information for specifying the control information includes a part or all of information for obtaining, from other than the P2P database, information indicating a network structure, a hyperparameter that is a parameter for learning, a training data set for learning, and learned data.

8. A processing device comprising:
circuitry configured to function as:
an acquisition unit that obtains, from a distributed network, one or both of control information for causing artificial intelligence to function in a device comprising learned data comprising a learned neural network module and information for specifying the control information from a distributed network comprising a neural network, a parameter for learning comprising a number of neurons and a number of network layers, and a training data set, and that verifies with a private key a validity of the one or both of control information for causing artificial intelligence to function in a device and information for specifying the control information; and
a processing unit that executes a predetermined process using the artificial intelligence that functions on a basis of the control information,
wherein the processing unit registers, in a peer-to-peer (P2P) database, information indicating a state after execution of the predetermined process by executing a program for causing a set process to be automatically executed in a case where a set condition is satisfied, the program being registered in the P2P database,
wherein the acquisition unit obtains one or both of the control information and the information for specifying the control information from the P2P database, wherein the control information and the information for specifying the control information are electronically signed using a secret key and encrypted using a public key,
wherein the P2P database is of a P2P network that is the distributed network,
wherein the P2P database comprises a distributed file system utilizing the P2P network.

9. The processing device according to claim 1, wherein the acquisition unit obtains, from the P2P database, one or both of the control information satisfying an acquisition condition and the information for specifying the control information satisfying the acquisition condition.

10. The processing device according to claim 8, wherein in a case where the information for specifying the control information is obtained from the distributed network, the acquisition unit obtains the control information specified by the information for specifying the control information from an external device.

11. A method for processing information to be executed by a providing device, the method comprising:
enabling acquisition of one or both of control information for causing artificial intelligence to function in a device comprising learned data comprising a learned neural network module and information for specifying the control information from a distributed network comprising a neural network, a parameter for learning comprising a number of neurons and a number of network layers, and a training data set, and verifying with a private key a validity of the one or both of control information for causing artificial intelligence to function in a device and information for specifying the control information;
obtaining one or both of the control information and the information for specifying the control information from a peer-to-peer (P2P) database, wherein the control information and the information for specifying the control information are electronically signed using a secret key and encrypted using a public key, wherein the P2P database is of a P2P network that is the distributed network, wherein the P2P database comprises a distributed file system utilizing the P2P network; and
registering, in the P2P database, information indicating a state after execution of a predetermined process by executing a program for causing a set process to be automatically executed in a case where a set condition is satisfied, the program being registered in the P2P database.

12. A non-transitory computer-readable storage medium encoded with executable instructions that, when executed by at least one processor, cause the at least one processor to perform:
enabling acquisition of one or both of control information for causing artificial intelligence to function in a device comprising learned data comprising a learned neural network module and information for specifying the control information from a distributed network comprising a neural network, a parameter for learning comprising a number of neurons and a number of network layers, and a training data set;
verifying with a key a validity of the one or both of control information for causing artificial intelligence to function in a device and information for specifying the control information;
obtaining one or both of the control information and the information for specifying the control information from a peer-to-peer (P2P) database wherein the control information and the information for specifying the control information are electronically signed using a secret key and encrypted using a public key, wherein the P2P database is of a P2P network that is the distributed network, wherein the P2P database comprises a distributed file system utilizing the P2P network; and
registering, in the P2P database, information indicating a state after execution of a predetermined process by executing a program for causing a set process to be automatically executed in a case where a set condition is satisfied, the program being registered in the P2P database.

* * * * *